(12) United States Patent
Horn

(10) Patent No.: US 6,481,793 B1
(45) Date of Patent: Nov. 19, 2002

(54) SEAT COVER FOR PROTECTING MOTOR VEHICLE SEATS

(75) Inventor: Joachim Horn, Schwalmstadt-Treysa (DE)

(73) Assignee: Horn & Bauer GmbH & Co. KG, Schwalmstadt-Treysa (DE)

( * ) Notice: Subject to any disclaimer, the term of this patent is extended or adjusted under 35 U.S.C. 154(b) by 0 days.

(21) Appl. No.: 09/577,227

(22) Filed: May 23, 2000

(30) Foreign Application Priority Data

May 25, 1999 (DE) .......................................... 199 23 889

(51) Int. Cl.[7] .............................................. A47C 31/00
(52) U.S. Cl. ..................... 297/228.1; 297/224; 297/229
(58) Field of Search ........................ 297/228.1, 228.11, 297/219.1, 224, 225, 229

(56) References Cited

U.S. PATENT DOCUMENTS

| | | | | |
|---|---|---|---|---|
| 3,504,841 A | * | 4/1970 | Gerard | 297/228.1 |
| 4,958,886 A | * | 9/1990 | Barattini et al. | 297/224 X |
| 5,265,933 A | * | 11/1993 | Croshaw | 297/228.1 |
| 5,618,082 A | * | 4/1997 | Jachmich | 297/229 |
| 5,709,431 A | * | 1/1998 | Horn | 297/228.1 |
| 5,868,465 A | * | 2/1999 | Kvalvik | 297/228.1 X |
| 5,911,476 A | * | 6/1999 | Horn | 297/228.1 X |
| 6,050,639 A | * | 4/2000 | Horn | 297/228.1 X |
| 6,131,995 A | * | 10/2000 | Smith | 297/229 |
| 6,352,299 B1 | * | 3/2002 | Ames et al. | 297/228.1 X |

FOREIGN PATENT DOCUMENTS

| | | | | |
|---|---|---|---|---|
| DE | 16 30 878 | | 4/1967 | |
| DE | 19 20 529 | | 4/1969 | |
| DE | 41 32 714 C1 | | 10/1991 | |
| WO | WO 95/03192 | * | 2/1995 | 297/228.1 |

* cited by examiner

Primary Examiner—Rodney B. White
(74) Attorney, Agent, or Firm—Thomas, Kayden, Horstemeyer & Risley

(57) ABSTRACT

A seat cover (1) is designed to be mounted on a motor vehicle seat (16) to protect the seat (16). The seat cover (1) includes a continuous front layer (3) of plastic foil being designed and arranged to protect the surface of a seating (21) and of a backrest (15) of a motor vehicle seat (16). A rear (2) layer of plastic foil is connected to the front layer (3) by transverse welding (6, 7), and it includes a recess (9) with closed edges (18, 19). At least a portion of the rear layer (2) is made of an elastic and retractable material. A first pocket (12) is formed by the rear layer (2) and the front layer (3), and it is designed and arranged to receive at least a portion of the backrest (15) of the seat (16). A second pocket (14) is formed by the rear layer (2) and the front layer (3), and it is designed and arranged to receive at least a portion of the seating (21) of the seat (16).

28 Claims, 2 Drawing Sheets

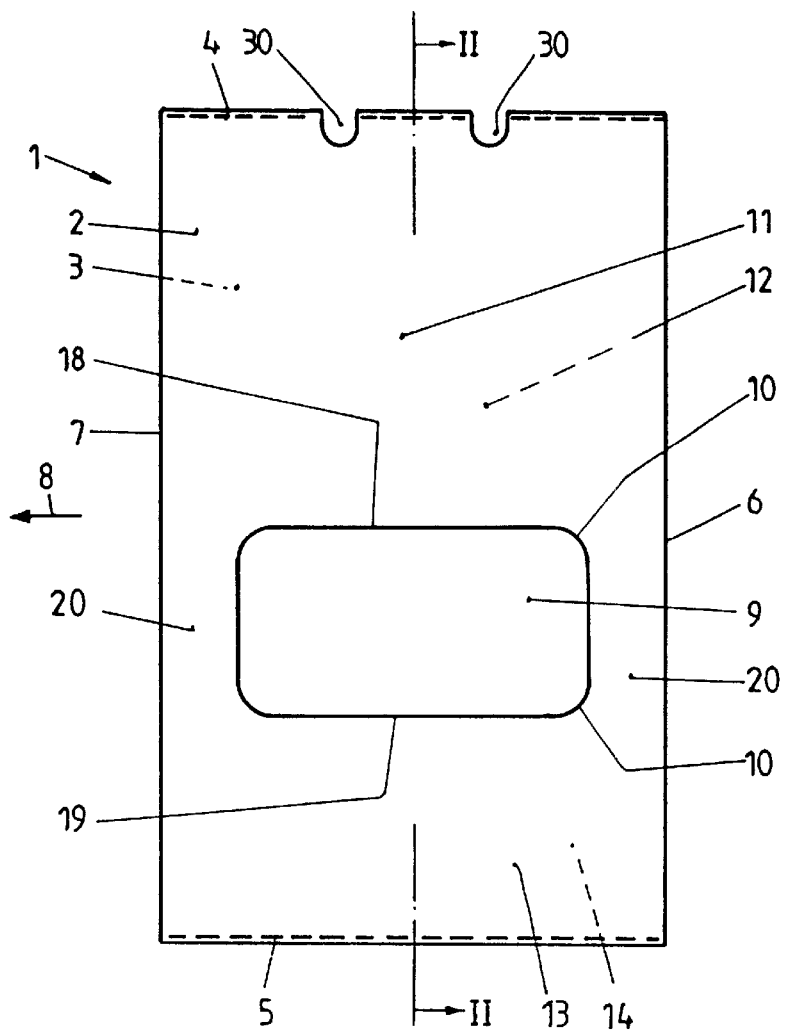
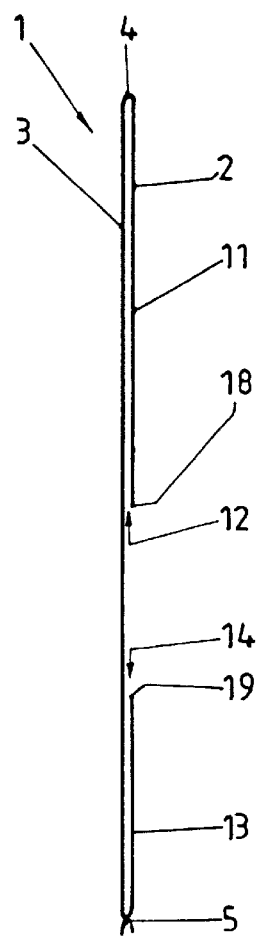
Fig. 1   Fig. 2
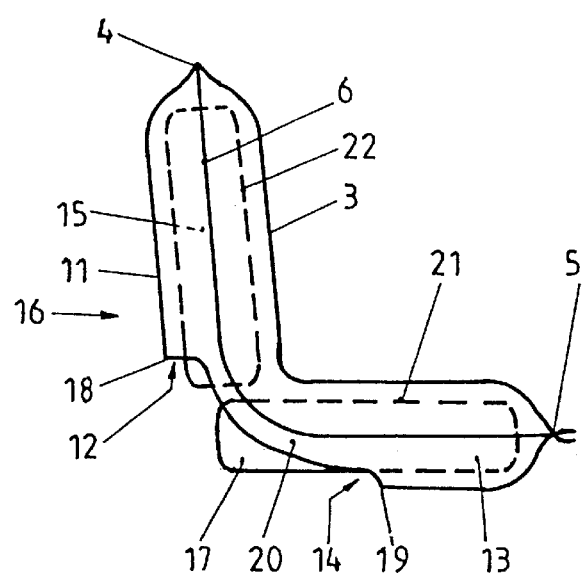
Fig. 3

SEAT COVER FOR PROTECTING MOTOR VEHICLE SEATS

CROSS REFERENCE TO RELATED APPLICATIONS

This application claims the benefit of co-pending German Patent Application No. 199 23 889.8-16 entitled "Schutzbezug, insbesondere Sitzbezug zum Schutz eines Kraftfahrzeug-Sitzes aus einem doppellagigen Teil aus Kunststoffolie sowie Verfahren zu seiner Herstellung" filed on May 25, 1999.

FIELD OF THE INVENTION

The present invention generally relates to a protective cover for objects. More particularly, the invention relates to a seat cover for the protection of a motor vehicle seat, especially for initially equipping. The invention also relates to a method of manufacturing such seat covers of plastic foil.

BACKGROUND OF THE INVENTION

Seat covers made of plastic foil are put on, or drawn over automobile seats in order to avoid soiling the automobile seat by workers and other persons. The use of such seat covers has been known in car repair shops when an inspection or a repair is carried out at the automobiles. Also when initially equipping an automobile, i.e. in the automobile manufacturing plant, when the automobile is assembled, the automobile seats are already exposed to a possibility of being dirtied. This risk of being dirtied starts already in the automobile seat manufacturing plant and when supplying the seats to the automobile manufacturing plant. It continues when the seats are placed on the conveyors which, in the end, lead to the assembly line of the automobile. Also during the assembly of the automobile, a plurality of mechanics successively comes in contact with the automobile seats. Finally, the assembled automobile must be driven off the belt, driven onto trucks or freight cars and finally handled again several times at the car dealer, until finally the automobile is turned over into the hands of the buyer or purchaser, respectively. From the fabrication of the seat at the supplier until the delivery of the automobile to the purchaser or customer, the automobile seats come into contact with approximately 30 to 35 mechanics and other persons, so that there is a considerable dirt risk. In order to counteract this dirt risk, seat covers made of plastic foil have been known which are pulled over the automobile seats, especially over the driver's seat, often already at the seat manufacturer, but at the latest at the automobile manufacture, and are removed just before the automobile is delivered to the customer. Such temporary seat covers do not normally differ from the seat covers which are used during the inspection or repair of an automobile. They can be made of a comparatively thick plastic foil which withstands greater wear.

A seat cover is known from German patent DE 41 32 714 C1. The regions of the rear layer forming the two pockets are connected by connection strips which extend across the free edges of the regions forming the pockets along the transverse welding. The connecting strips are also connected with the front layer so that the substantially continuous rear layer includes a recess with closed edges. The two layers of the seat cover, i.e. the front layer and the rear layer, thus includes a contour of the same size and are joined with each other at all four edges, continuously in the region of the transverse welding as well as in the region of the longitudinal edges. While the front layer is designed as a continuously closed piece, there is a recess in the rear layer which is arranged at all sides and at a distance from the contour of the seat cover lying flat and represents the only recess by means of which the seat cover can be pulled over the backrest and the seat cushion. By means of the connecting strips, apart from the two previously known pockets, additional transverse pockets connecting the pockets are created which reach behind the backrest in the transition region and, thus, effectively protect the automobile seat in these exposed places against dirt. The risk of the seat cover slipping off when using the automobile seat which is protected by the seat cover has practically been eliminated. In spite of that, handwork is avoided totally during the manufacture of this seat cover. The additional use of rubber bands, foil strips and the like is no longer required either, and there is no additional assembly work any more. Rather, when pulling on the seat cover, it automatically arrives in its protecting position enveloping the seat cushion as well as the backrest. By means of transverse welding the front layer is continuously joined with the rear layer at each seat. On the other hand, the transverse welding can be done in a way that the individual seat covers are separated from each other at the same time, so that they can be put down stacked one upon the other and in this manner can be shipped to the seat manufacturer or the automobile manufacturer. Besides, it is also possible to leave the individual seat covers joined by perforations and to wind such an endless line on a storage spool. The plastic foil used to manufacture the seat covers has only minor thickness for reasons of economizing on material, so that when pulling it on, there is a risk of tearing. In such a case the proper fit of the seat cover on the automobile seat is no longer guaranteed.

When automobile seats suspended from a conveyor belt with their backrests pointing downward are supplied to the assembly line of the automobile, there is further the risk that the seat covers inadvertently slip from the automobile seat and drop. Thus, they no longer fulfill their protective function. In order to counteract this risk, it has been known to use a rubber band as separate part of the seat cover which, after pulling the seat cover over the backrest, is guided over the backrest as closed loop in a way that it fits between the seat cushion and the backrest in the transition region. Through this step the unintentional dropping of a seat cover from a suspendedly conveyed automobile seat is prevented. At the same time, the front layer of the seat cover is fixed by the rubber band in the transition region between seat cushion and backrest, so that the risk of slipping out of place is counteracted. However, the use of such rubber bands in addition to seat covers is more costly and is only a limited cure against the risk of dirt.

Instead of the additional use of a rubber band, it has also been known to weld two foil strips to approximately the middle region of the free edge of the pocket which envelopes the backrest. These two foil strips are looped forward across the seat, in the way of strings of an apron, and are knotted together there, so that also here a tighter fit of the front layer of the seat cover in the transition region between seat cushion and backrest is achieved. The manufacture of this additional foil strip and especially the welding is costly, after placing the seat cover it requires an additional knotting step and, furthermore, also is only a limited remedy against the risk of dirt. Compared with a rubber band, the foil strips are placed comparatively too high at the backrest.

It is also known in the art to manufacture a seat cover as described in German DE-AS 16 30 878. The known seat cover has been further developed, as it is generally known in the art. After separating the line of plastic into the individual seat covers, a half-tube is welded along the free edges of the pockets formed by the rear layer as well as along the free edges of the front layer in the region not covered by the pockets. When welding the half-tube, a rubber band in the form of a loop is inserted. With this rubber band an opening is created at the seat cover, which is used to pull it over the automobile seat, the rubber band exerting a certain stretching effect so that especially the front layer of the seat cover is held closer to the seat cushion and to the backrest. Such a seat cover is especially time-consuming and expensive because of the welding of the half-tube with the rubber band, which is done by hand, but on the other hand it achieves effective protection. Putting such a seat cover over an automobile seat is comparatively more difficult than is the case with the seat cover described initially.

Further, it has been known to shrink the seat cushion on the one hand and the backrest on the other hand into one each shrink foil piece already at the manufacturer's of the automobile seat, and only subsequently when mounting the seat, to bring the seat cushion and the backrest together. These two parts of shrink foil then remain on the automobile seat and protect it on its entire way from automobile manufacturer to the delivery of the automobile to the customer or purchaser. The shrinking, however, signifies considerable additional expenditure, also for the respective shrink devices.

Further, it has been known, particularly from low-wage countries, to sew a rubber band onto the edge of a plastic foil seat cover opening with closed edges. The sewing is done by hand and by fixing the rubber band under bias. As a consequence, the rubber band as an elastic foreign element contracts and the non-elastic foil forms wrinkles. This does not only disturb the appearance, but also prevents winding onto a spool. Even as individual pieces in a stack such seat covers are hard to handle. More disadvantages, such as wrinkled fit on the automobile seat, a sensitivity to electronic barriers or the like, initial tearing and continued tearing of the foil are a consequence.

SUMMARY OF THE INVENTION

Briefly described, the present invention provides a protective cover for objects. The cover includes a continuous protecting front layer and a rear layer being connected to the front layer by welding. The rear layer includes a recess with closed edges. At least a portion of the rear layer is made of an elastic and retractable material. A pocket is formed by the rear layer and the front layer. For example, the invention also relates to a steering wheel protection with a circular front layer which is joined wrinkle-free with a rear layer, to a tire protection, for example the spare tire or a snow tire. The protective cover can also be used for the protection of pillows, armchairs or other furniture or for parts of furniture. It can also be used for the protection of shopping trolleys in supermarkets. Another application relates to the field of hygiene and hospitals. In these cases the protective cover can be pulled on a mattress or a part of a mattress. In all of these cases, the front layer can be used as advertising carrer.

The present invention also provides a seat cover to be mounted on a motor vehicle seat to protect the seat. The seat cover includes a continuous front layer of plastic foil being designed and arranged to protect the surface of a seating and of a backrest of a motor vehicle seat. A rear layer of plastic foil is connected to the front layer by transverse welding, and tt includes a recess with closed edges. At least a portion of the rear layer is made of an elastic and retractable material. A first pocket is formed by the rear layer and the front layer, and it is designed and arranged to receive at least a portion of the backrest of the seat. A second pocket is formed by the rear layer and the front layer, and it is designed and arranged to receive at least a portion of the seating of the seat.

The present invention also relates to a method of producing seat covers for the protection of motor vehicle seats. The method includes the steps of forming a first line of a flat plastic foil defining a front layer of the seat cover, forming a second line of a flat plastic foil defining a rear layer of the seat cover, at least a portion of the rear layer being made of an elastic and retractable material, punching a recess into the second line defining the rear layer of each cover, and connecting the first and second line by at least one transverse welding and by at least one longitudinal welding.

The invention starts from the idea to modify the material properties of the plastic foil used for the manufacture of the seat cover in a way that the seat cover can be removed at least partly from the seat cushion of the automobile seat and put on again. This is intended to be possible at least several times without the plastic foil tearing or the tight fit substantially relaxing or losing effect after putting the cover on again. Thus, the issue is the use of an elastic foil for at least certain regions of the seat cover. The elasticity and the retractability connected therewith are employed in order to allow removal and re-placement. This can be meaningful already when mounting the automobile seat in the automobile, because in removed condition fixing screws of the seat are easier to reach. Also when mounting a drawer, a fire extinguisher, a first aid kit or the like it can be useful or even required to temporarily loosen the seat cover pocket which envelopes the seat cushion without loosening the seat cover pocket enveloping the backrest. A similar thing applies to the connection or the setting of seat motors which adjust the seat position, ventilation devices and the like. In such cases it can happen that the seat cover must be removed about ten times or more and pulled on again. Also after that the seat cover must fulfill its protective function properly. The seat cover can advantageously be manufactured in smaller dimensions than before. In spite of that, the elasticity of a stretchable foil renders an easy handling when pulling the seat cover on and it provides a better fit. The seat cover obtains gum-elastic properties, so to say, and the retractability is exploited advantageously. In put-on condition the seat cover adapts exactly to the contours of the automobile seat. Thus, there is no possibility of interference if, for example, the correct position of the automobile seat in the automobile is measured and checked by means of electronic barriers. Projecting foil pieces or wrinkles of the seat cover on the automobile seat can no longer lead to a disturbance. The new seat cover also has advantages when putting it or pulling it onto an automobile seat. It can be pulled on quickly and securely as well as wrinkle-free tightly fitting the contours of the automobile seat.

The elastic foil is preferably used in the region of the rear layer of the seat cover and even there only in part or in regions, respectively. At least the connecting strips consist of the elastic retractable material. This already suffices in order to achieve the desired effect in the region of the pocket enveloping the seat cushion. But it is also possible to form larger regions of the rear layer or of the entire rear layer of the gum-elastic material.

The elastic retractable material preferably has such elasticity and such retractability that the seat cover can be pulled onto the automobile seat and pulled off again several times. This corresponds to the conditions of application in the mounting of an automobile seat at the assembly line of the automobile. In this process the foil must withstand such handling without tearing initially or continuing to tear. Particularly, the plastic foil forming the rear layer has an elastic stretch of at least 50%, preferably at least 60%. Whether a foil material meets these requirements can be determined in a simple test, for example as follows: Starting from a test strip of 50 mm length in unstretched condition, there is a briefly acting stretch of this test strip to 150 mm (200%) with subsequent relaxation. The test strip quickly assumes the remaining length of 75 mm, i.e. it plastically stretched from 50 mm to 75 mm. The total stretch of 200% consists of 50% plastic stretch and 150% elastic stretch. Thus, the tested plastic foil has an elastic stretch of 150%.

The opening with closed edges advantageously has an oval form or a rectangular form with rounded corners. This is advantageous from a number of aspects. The risk of tearing is further reduced and the tight fit is favored. The automobile seat is enclosed optimally and, thus, protected.

The rear layer can consist of a co-polymer, especially of ethylene vinylacetate or butene vinylacetate. Also other materials may meet the requirements, such as a thermoplastic elastomer or an especially elastic low-density material which is used at least in layers or in mixtures or 100%.

The rear layer can consist of a multilayer foil, one of the layers of which has high initial tearing and continued tearing resistance and the other layer has high retractability. The arrangement of the two layers relative to the automobile seat is optional.

The multilayer foil forming the rear layer may include a third layer with good welding properties, which layer is applied facing the front layer.

The plastic foil forming the front layer can be designed to be slip-proof on the inner surface facing the automobile seat and smooth on the outer surface. Thus, there is no risk that the seat cover slips out of place relative to the automobile seat when the automobile is assembled, even when the mechanics sit onto the automobile seat up to approximately 35 times, as is known.

The method of producing seat covers for the protection of motor vehicle seats starts from the point that lines are formed of plastic foil in the shape of flat foils which form the front layer and the rear layer and that the two lines are joined with each other for each cover by transverse welding and by at least one longitudinal welding. According to the invention, a recess with closed edges having oval or rectangular shape with rounded corners is placed into the line forming the rear layer of each seat cover in the way of a cut or a cutout. At least the rear layer is completely or partly formed of elastic, retractable material. Through the use of flat foils it is readily possible to combine and weld together different materials. The front layer and the rear layer can each be formed of a flat foil. The two lines are joined with each other via two longitudinal weldings. It is clear that these two longitudinal seams which are generated by the longitudinal welding extend in the conveying direction of the endless lines of the flat foils. Through this special shaping the two free corners of the seat cushion are enveloped especially effectively and extensively and protected. At the same time, the seat cover has the required mobility to be pulled over the automobile seat easily. Through this special design of the connecting strips the recess with closed edges is given an oval or rectangular shape. The recess with closed edges can be obtained by making a cutout, i.e. by a piece being cut out from the line of the rear layer. But it is also possible to obtain the recess only by a U-shaped cut and leaving a respective flap at the rear layer which has no disturbing effect when handling the seat cover. The recess with closed edges has rounded corners so that tearing of the plastic foil is avoided when pulling the seat cover over the automobile seat.

In the described manufacturing possibilities, the line forming the front layer and/or the line forming the rear layer can be designed to be slip-proof. This applies particularly to the line forming the front layer so that the seat cover cannot slip out of place laterally in this region, when it is exposed to stress by the mechanic or by other operating staff sitting on it and rising. The adherence of the front layer to the automobile seat relieves the stress on the weldings.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The opponents in the drawings are not necessarily to scale, emphasis instead being placed upon clearly illustrating the principles of the present invention. In the drawings, like reference numerals designate corresponding parts throughout the several views.

FIG. 1 is a top view of a seat cover lying flat on its rear layer.

FIG. 2 is a sectional view according to line II—II in FIG. 1.

FIG. 3 is a side view of an automobile seat with the seat cover pulled on according to FIGS. 1 and 2.

DETAILED DESCRIPTION

Figure 4:
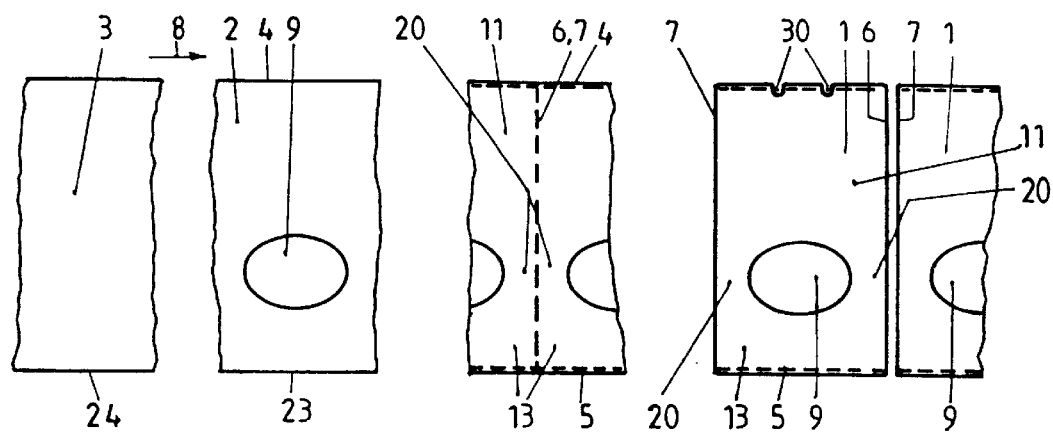
FIG. 4 is a top view of an endless line consisting of two flat foils in the form of a half-tube to illustrate several manufacturing steps more clearly.

Referring now in greater detail to the drawings, FIG. 1 illustrates a seat cover 1 in a condition as lying flat. The seat cover 1 includes a double-layer plastic foil. The top view shows the view from the back, i.e. the direct top view onto a rear layer 2. Under the rear layer 2 there is as second layer a front layer 3. After welding, the rear layer 2 and the front layer 3 form one joined piece of plastic foil material, the rear layer 2 being joined with the front layer 3 via a first longitudinal welding 4. On the other longitudinal side the rear layer 2 and the front layer 3 are also joined via a second longitudinal welding 5 in the form of a continuous longitudinal welding seam. Even though these longitudinal welding seams 4 and 5 are indicated as dashed lines, it is expedient to apply these longitudinal seams continuous, i.e. without any places of interruption. However, apart from the region of longitudinal seam 4 and longitudinal seam 5 the rear layer 2 is joined with the front layer 3 also via transverse welding seams 6 and 7. The transverse welding seams 6 and 7 join the longitudinal welding seam 4 and extend as far as longitudinal welding seam 5 so that, in the end, the rear layer 2 and the front layer 3 are continuously joined with each other along their contours. The terms longitudinal and transverse are chosen in view of a conveying direction according to arrow 8, i.e. a direction in which an endless line is processed in the manufacture of individual seat covers. Thus, the longitudinal welding seam 4 and the longitudinal welding seam 5 extend parallel to the arrow 8, whereas the transverse welding seams 6 and 7 extend in transverse relationship. In manufacturing flat foils can be used for the front layer 3 on the one hand and the rear layer 2 on the other hand. But it is also possible to make the entire seat cover of tube material with respective retracting properties.

In the rear layer 2 a recess 9 with closed edges and rounded corners 10 is provided. This recess 9 includes an approximately rectangular contour and is arranged in the inner field of the rear layer 2, i.e. distanced from the longitudinal welding seams, the longitudinal welding seam 5 and also the transverse welding seams 6 and 7. As one can see, this recess 9 which can be formed by a cutout or a cut is not provided to be symmetrically in the center, but displaced in the direction towards the one longitudinal edge. The front layer 3 does not have such a recess but is provided in one continuous piece.

A region of the rear layer with the underlying region of the front layer 3 forms a first pocket 12. A region 13 of the rear layer 2 with a corresponding region of the front layer 3 forms a second pocket 14 below the recess 9. By the eccentric arrangement of the recess 9 the upper pocket 12 is formed to be comparatively lower and longer than the lower pocket 14. The upper pocket 12 serves to receive or envelope, respectively, a backrest 15 (FIG. 3) of an automobile seat 16, whereas the lower pocket 14 is pulled over the pertaining seat cushion 17 of the automobile seat 16.

Through the recess 9 the pocket 12 includes a free edge 18, so to speak, and the pocket 14 includes a free edge 19 which substantially extend parallel to the arrow 8. The two edges 18 and 19 or the regions 11 and 13, respectively, of the rear layer 2 are connected with each other via connecting strips 20. These connecting strips 20 are components of the rear layer 2. It is important that the transverse welding seams 6 and 7 be provided in continuous form, so that also the connecting strips 20 are joined with the front layer 3. It is the connecting strips 20 which very effectively reach around or reach behind the automobile seat 16 in the transition region between seat cushion 17 and backrest 15, and thus protect it from dirt (FIG. 3). In the pulled-on position of the seat cover 1, the front layer 3 extends along the automobile seat 16, across the seating 21 of the seat cushion 17 and across the resting surface 22 of the backrest 15 which comes into effective contact with the user's back. The rear layer 2, however, reaches behind the backrest 15 and reaches under the seat cushion 17.

As apparent from the sectional view of FIG. 2 the double-layer design of the seat cover 1 is shown more clearly once more, wherein for the sake of clarity the connecting strips 20 are not shown.

Figure 5:
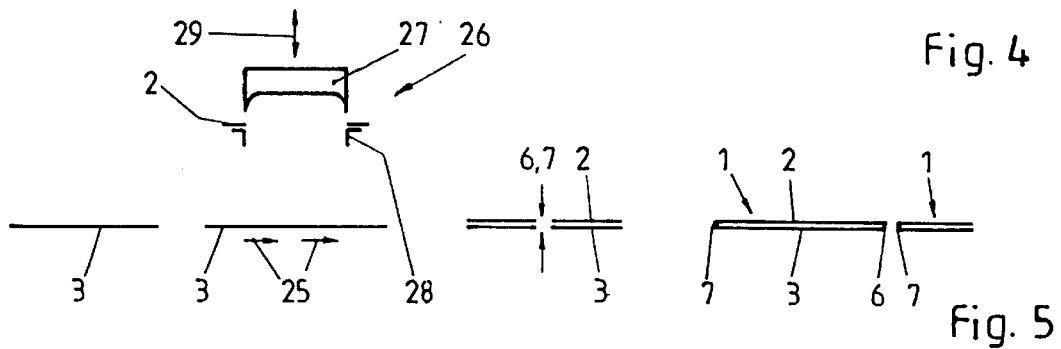
FIG. 5 is a pertaining side view.

FIGS. 4 and 5 show in several steps a manufacturing possibility for the seat cover 1 according to FIGS. 1 to 3. Here, flat foils in endless lines of plastic foil are used. In a first processing step the two lines forming the rear layer 2 and the front layer 3 are guided distanced from one another (see particularly FIG. 5) and are moved step by step according to arrows 25 forward towards arrow 4. In doing so the line forming the rear layer 2 is guided through a punch tool 26 whose upper die part 27 is disposed above the line forming the rear layer 2, whereas the pertaining lower die part 28 is disposed fixed in place below the line forming the rear layer 2, i.e. between the line forming the rear layer 2 and the line forming the front layer 3. The upper die part 27 is driven to move up and down, according to double arrow 29, wherein at each stroke a hole forming the recess 9 is punched out, and the punched out piece falls off and is removed. It is also possible to use an automatic knife to cut the opening 9 out, the cut-out piece is then waste.

In another manufacturing step the lines forming the rear layer 2 and the front layer 3 are guided flat one on top of the other and longitudinal welding seams 4 and 5 and transverse welding seams 6 and 7 are made, these transverse welding seams 6 and 7 being illustrated more clearly by two arrows in FIG. 5. The transverse welding seams 6 and 7 on the one hand join the rear layer 2 with the front layer 3 and on the other hand separate the preceding seat cover 1 from the following seat cover 1. Simultaneously with the step of providing the recess 9, also two punch-outs 30 can be provided in the region of the longitudinal welding seam 4, which are intended for mounting a headrest on the backrest 15. But making these punch-outs 30 can also be carried out together with the longitudinal welding seam 5 or the transverse welding seams 6 and 7. However, the shown relative position is advantageous because in that case the recess 9 is arranged in the region of a free longitudinal edge 23. The free longitudinal edge 24 of the front layer 3 corresponds with the free longitudinal edge 23 of the backrest 2.

Figure 6:
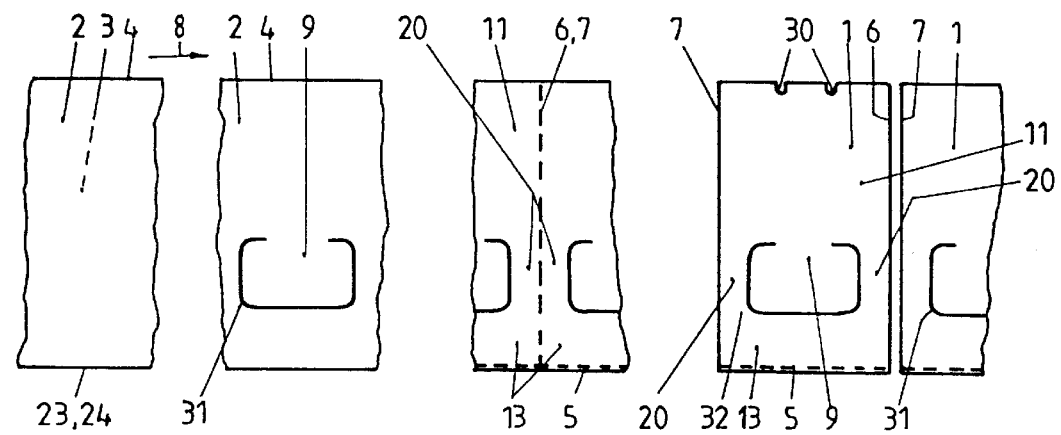
FIG. 6 is a top view of an endless line consisting of two flat foils to illustrate several manufacturing steps more clearly.
Figure 7:
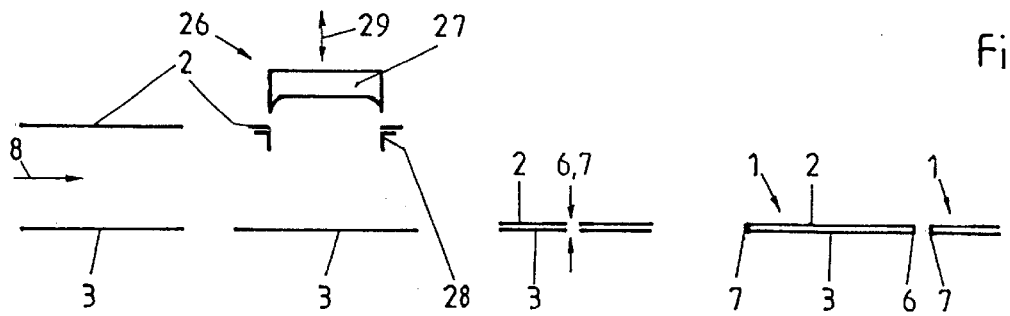
FIG. 7 is the side view pertaining to FIG. 6.

FIGS. 6 and 7 illustrate another manufacturing possibility for a slightly modified seat cover 1. Also in this case, two separate flat foils are used, the one flat foil forming the rear layer 2 and the other flat foil forming the front layer 3. Also in this case there is a longitudinal welding seam 4, whereas at the other longitudinal edge, the longitudinal welding seam 5 is provided. Here also a recess 9 is provided in the rear layer 2. However, no opening is punched out which then becomes a waste piece, but merely a U-shaped defined cut 31 is applied so that a flap comes into existence and a waste piece is avoided. Such a flap also forms the recess 9 and does not obstruct the pulling on of the seat cover 1 onto the automobile seat 16.

Many variations and modifications may be made to the preferred embodiments of the invention without departing substantially from the spirit and principles of the invention. All such modifications and variations are intended to be included herein within the scope of the present invention, as defined by the following claims.

I claim:

1. A protective cover for automobile seats having a seat cushion and a back rest extending upwardly from the seat cushion, said protective cover comprising:

a front layer of plastic foil having a perimeter and a predetermined length and width, a rear layer formed of elastic and retractable plastic foil, said rear layer when retracted being of the same length and width as said front layer and having a perimeter shaped similar to the shape of said perimeter of said front layer, said rear layer superposing said front layer with its perimeter aligned with said perimeter of said front layer and in flat abutment with said front layer, said perimeter of said front layer and said perimeter of said rear layer being welded together to hold said front and rear layers in flat abutment with each other when said rear layer is retracted so that multiple ones of said protective covers can be stored in superposed relationship without wrinkling of said front and rear layers, said rear layer defining an opening displaced from said perimeter of said rear layer leaving a first region on one side of said opening and a second region on the other side of said opening and with connecting strips extending between said first and second regions and straddling said opening, said front layer and said first region of said rear layer defining a first pocket for receiving the back rest of the car seat, said front layer and said second region of said rear layer defining a second pocket for receiving a seat cushion of the car seat, said connecting strips being sized and shaped to engage about the seat cushion and the back rest of the automobile seat, said second layer being expandable and retractable across its entire length and width for expanding said opening and said first and second pockets to receive the back rest and seat cushion of the automobile seat and for retracting about the seat cushion and back rest of the automobile seat and for multiple use of said protective cover.

2. A protective cover for objects, comprising:

a continuous protecting front layer being made of plastic foil;

a rear layer being made of plastic foil, being connected to said front layer by welding and including a recess with closed edges, at least a portion of said rear layer being made of elastic and retractable plastic foil in a way that said protective cover is mountable and demountable on objects for a plurality of times; and a pocket being formed by said rear layer and said front layer.

3. The protective cover of claim 2, wherein the plastic foil forming said rear layer has an elastic stretch of at least 50 percent.

4. The protective cover of claim 2, wherein the plastic foil forming said rear layer has an elastic stretch of at least 60 percent.

5. The protective cover of claim 2, wherein said rear layer is made of a co-polymer.

6. The protective cover of claim 2, wherein said rear layer is made of ethylene vinylacetate.

7. The protective cover of claim 2, wherein said rear layer is made of butene vinylacetate.

8. The protective cover of claim 2, wherein said recess has an oval shape.

9. The protective cover of claim 2, wherein said recess has a rectangular shape with rounded corners.

10. The protective cover of claim 2, wherein said rear layer is made of a multi layer foil, a first layer of which having high resistance to initial tearing and continued tearing, and a second layer of which having high retractability.

11. The protective cover of claim 10, wherein the multilayer foil forming said rear layer includes a third layer facing said front layer, said third layer having good welding properties.

12. A seat cover to be mounted on a motor vehicle seat to protect the seat, said seat cover comprising:

a continuous front layer of plastic foil being designed and arranged to protect the surface of a seating and of a backrest of a motor vehicle seat;

a rear layer of plastic foil being connected to said front layer by transverse welding and including a recess with closed edges, at least a portion of said rear layer being made of elastic and retractable plastic foil in a way that said protective cover is mountable and demountable on motor vehicle seats for a plurality of times;

a first pocket being formed by said rear layer and said front layer and being designed and arranged to receive at least a portion of the backrest of the seat; and a second pocket being formed by said rear layer and said front layer and being designed and arranged to receive at least a portion of the seating of the seat.

13. The seat cover of claim 12, wherein the plastic foil forming said rear layer has an elastic stretch of at least 50 percent.

14. The seat cover of claim 12, wherein the plastic foil forming said rear layer has an elastic stretch of at least 60 percent.

15. The seat cover of claim 12, wherein said rear layer is made of a co-polymer.

16. The seat cover of claim 12, wherein said rear layer is made of ethylene vinylacetate.

17. The seat cover of claim 12, wherein said rear layer is made of butene vinylacetate.

18. The seat cover of claim 12, wherein said recess has an oval shape.

19. The seat cover of claim 12, wherein said recess has a rectangular shape with rounded corners.

20. The seat cover of claim 12, wherein said rear layer is made of a multi layer foil, a first layer of which having high resistance to initial tearing and continued tearing, and a second layer of which having high retractability.

21. The seat cover of claim 20, wherein the multilayer foil forming said rear layer includes a third layer facing said front layer, said third layer having good welding properties.

22. The seat cover of claim 12, wherein the plastic foil forming the front layer is designed to be slip-proof at its inner side to face the seat, and to be smooth at its outer side.

23. The seat cover of claim 12, wherein said rear layer includes connecting strips connecting said first and second pocket and being designed and arranged to protect the side surfaces of the seating and of the backrest in a region between the seating and the backrest in a mounted position.

24. The seat cover of claim 12, wherein said connecting strips are made of an elastic and retractable material.

25. A method of producing seat covers for the protection of motor vehicle seats, said method comprising the steps of:

forming a first line of a flat plastic foil defining a front layer of the seat cover;

forming a second line of a flat plastic foil defining a rear layer of the seat cover, at least a portion of the rear layer being made of elastic and retractable plastic foil in a way that the seat covers are mountable and demountable on motor vehicle seats for a plurality of times;

punching a recess into the second line defining the rear layer of each cover; and connecting the first and second line by at least one transverse welding and by at least one longitudinal welding.

26. The method of claim 25, wherein the recess is formed by a continuous closed punching line.

27. The method of claim 25, wherein the recess is formed by a discontinuous partially opened punching line.

28. The method of claim 25, wherein the recess is punched to have a rectangular shape.

* * * * *